United States Patent
Wijnands et al.

(10) Patent No.: US 9,083,636 B2
(45) Date of Patent: Jul. 14, 2015

(54) SYSTEM AND METHOD FOR MULTIPOINT LABEL DISTRIBUTION PROTOCOL NODE PROTECTION USING A TARGETED SESSION IN A NETWORK ENVIRONMENT

(75) Inventors: IJsbrand Wijnands, Leuven (BE); Eric Rosen, Arlington, MA (US); Syed Kamran Raza, Ottawa (CA); Nagendra Kumar, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 218 days.

(21) Appl. No.: 13/493,273

(22) Filed: Jun. 11, 2012

(65) Prior Publication Data

US 2013/0208582 A1    Aug. 15, 2013

Related U.S. Application Data

(60) Provisional application No. 61/597,904, filed on Feb. 13, 2012.

(51) Int. Cl.
G06F 11/00 (2006.01)
H04L 12/707 (2013.01)
H04L 12/939 (2013.01)
H04L 12/723 (2013.01)
H04L 12/703 (2013.01)

(52) U.S. Cl.
CPC .............. *H04L 45/22* (2013.01); *H04L 45/28* (2013.01); *H04L 45/507* (2013.01); *H04L 49/552* (2013.01)

(58) Field of Classification Search
CPC ......... H04L 45/28; H04L 45/22; H04L 45/50; H04L 45/507; H04L 47/825; H04L 49/552

USPC .................................................. 370/216–219
See application file for complete search history.

(56) References Cited

U.S. PATENT DOCUMENTS

| | | | |
|---|---|---|---|
| 6,987,727 B2 * | 1/2006 | Fredette et al. ............... | 370/225 |
| 7,058,845 B2 * | 6/2006 | Fujita ............................. | 714/4.2 |
| 7,436,782 B2 * | 10/2008 | Ngo et al. ..................... | 370/254 |
| 7,539,131 B2 * | 5/2009 | Shen ............................. | 370/217 |
| 7,586,841 B2 * | 9/2009 | Vasseur ........................ | 370/218 |
| 7,626,925 B1 * | 12/2009 | Sivabalan et al. ............. | 370/228 |
| 7,675,860 B2 * | 3/2010 | Vasseur et al. ................ | 370/237 |
| 7,889,641 B2 * | 2/2011 | Liu et al. ...................... | 370/228 |
| 8,040,792 B2 * | 10/2011 | Hanif et al. ................... | 370/218 |

(Continued)

OTHER PUBLICATIONS

Aggarwal, R., and JL. Le Roux, "MPLS Upstream Label Assignment for LDP", draft-ietf-mpls-ldp-upstream-10, IETF Internet-Draft, Feb. 2, 2011, 14 pages; http://tools.ietf.org/html/draft-ietf-mpls-ldp-upstream-10.

(Continued)

*Primary Examiner* — Chi H Pham
*Assistant Examiner* — Robert Lopata
(74) *Attorney, Agent, or Firm* — Patent Capital Group

(57) ABSTRACT

A method is provided in one example and includes receiving first address information from a protected node over a first label switched path having a first label. The first address information is associated with a first network element. A second label switched path has been previously established with the first network element. The method further includes establishing a targeted session with the first network element, assigning a second label to the second label switched path, and sending the second label to the first network element over the targeted session.

20 Claims, 9 Drawing Sheets

(56) References Cited

U.S. PATENT DOCUMENTS

| | | | |
|---|---|---|---|
| 8,259,564 B1* | 9/2012 | Gredler et al. | 370/227 |
| 8,576,708 B2* | 11/2013 | Gandhi et al. | 370/228 |
| 8,634,289 B2* | 1/2014 | Bejerano et al. | 370/217 |
| 8,804,749 B2* | 8/2014 | Jounay et al. | 370/401 |
| 2007/0011284 A1* | 1/2007 | Le Roux et al. | 709/223 |
| 2009/0185478 A1* | 7/2009 | Zhang | 370/216 |
| 2009/0219806 A1* | 9/2009 | Chen et al. | 370/219 |
| 2011/0199891 A1* | 8/2011 | Chen | 370/218 |
| 2011/0280123 A1 | 11/2011 | Wijnands et al. | |
| 2012/0099861 A1* | 4/2012 | Zheng | 398/45 |
| 2013/0089100 A1* | 4/2013 | Zhao et al. | 370/395.5 |
| 2013/0121169 A1* | 5/2013 | Zhao et al. | 370/242 |

OTHER PUBLICATIONS

Andersson, L., Minei, I., and B. Thomas, "LDP Specification," 136 pages; RFC 5036, IETF, Oct. 2007; http://tools.ietf.org/html/rfc5036.

Napierala, M. and E. Rosen, "Using LDP Multipoint Extensions on Targeted LDP Sessions", draft-napierala-mpls-targeted-mldp-02, IETF-Draft, Oct. 24, 2011, 9 pages; http://tools.ietf.org/html/draft-napierala-mpls-targeted-mldp-02.

Pan, P., Swallow, G., and A. Atlas, "Fast Reroute Extensions to RSVP-TE for LSP Tunnels", RFC 4090, IETF, May 2005, 39 pages; http://tools.ietf.org/html/rfc4090.

Thomas, B., Raza, K., Aggarwal, S., Aggarwal, R., and JL Le Roux, "LDP Capabilities", RFC 5561, IETF, Jul. 2009, 13 pages; http://tools.ietf.org/html/rfc5561.

Wijnands, IJ., "mLDP Node Protection", draft-wijnands-mpls-mldp-node-protection-00, IETF Internet-Draft, Feb. 24, 2012, 16 pages; http://www.ietf.org/id/draft-wijnands-mpls-mldp-node-protection-00.txt.

Wijnands, IJ., Minei, I., Kompella, K., and B. Thomas, "Label Distribution Protocol Extensions for Point-to-Multipoint and Multipoint-to-Multipoint Label Switched Paths", RFC 6388, IEFT, Nov. 2011, 40 pages; http://tools.ietf.org/html/rfc6388.

Wijnands, IJ., Minei, I., Kompella, K., and B. Thomas, "Label Distribution Protocol Extensions for Point-to-Multipoint and Multipoint-to-Multipoint Label Switched Paths," draft-ietf-mpls-ldp-p2mp-15, IETF Internet-Draft, Aug. 4, 2011, 40 pages; http://tools.ietf.org/html/draft-ietf-mpls-ldp-p2mp-15.

Zhao, Q. and E. Chen, "Protection Mechanisms for Label Distribution Protocol P2MP/MP2MP Label Switched Paths", draft-zhao-mpls-mldp-protections-01, IETF Internet-Draft, Nov. 23, 2011, 17 pages; http://tools.ietf.org/id/draft-zhao-mpls-mldp-protections-01.txt.

* cited by examiner ns. The ability to minimize packet loss or disruptions in the network presents a significant challenge to component manufacturers, network operators, and service providers alike.

SYSTEM AND METHOD FOR MULTIPOINT LABEL DISTRIBUTION PROTOCOL NODE PROTECTION USING A TARGETED SESSION IN A NETWORK ENVIRONMENT

CROSS-REFERENCE TO RELATED APPLICATION

This application claims the benefit of priority under 35 U.S.C. §119(e) to U.S. Provisional Application Ser. No. 61/597,904, entitled "mLDP NODE PROTECTION" filed Feb. 13, 2012, which is hereby incorporated by reference in its entirety.

TECHNICAL FIELD

This disclosure relates in general to the field of communications and, more particularly, to providing multipoint label distribution protocol node protection using a targeted session in a network environment.

BACKGROUND

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets.

Internet Protocol (IP) communications generally provide different types of communication methods across a network (e.g., unicast and multicast). Unicast is a method of point-to-point communication, and it is typically used when two nodes need to exchange data, where neither node is concerned with sharing the data with multiple hosts. Multicast communications can allow a group of hosts to receive messages without broadcasting those messages to all of the hosts in the broadcast domain. The ability to minimize packet loss or disruptions in the network presents a significant challenge to component manufacturers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
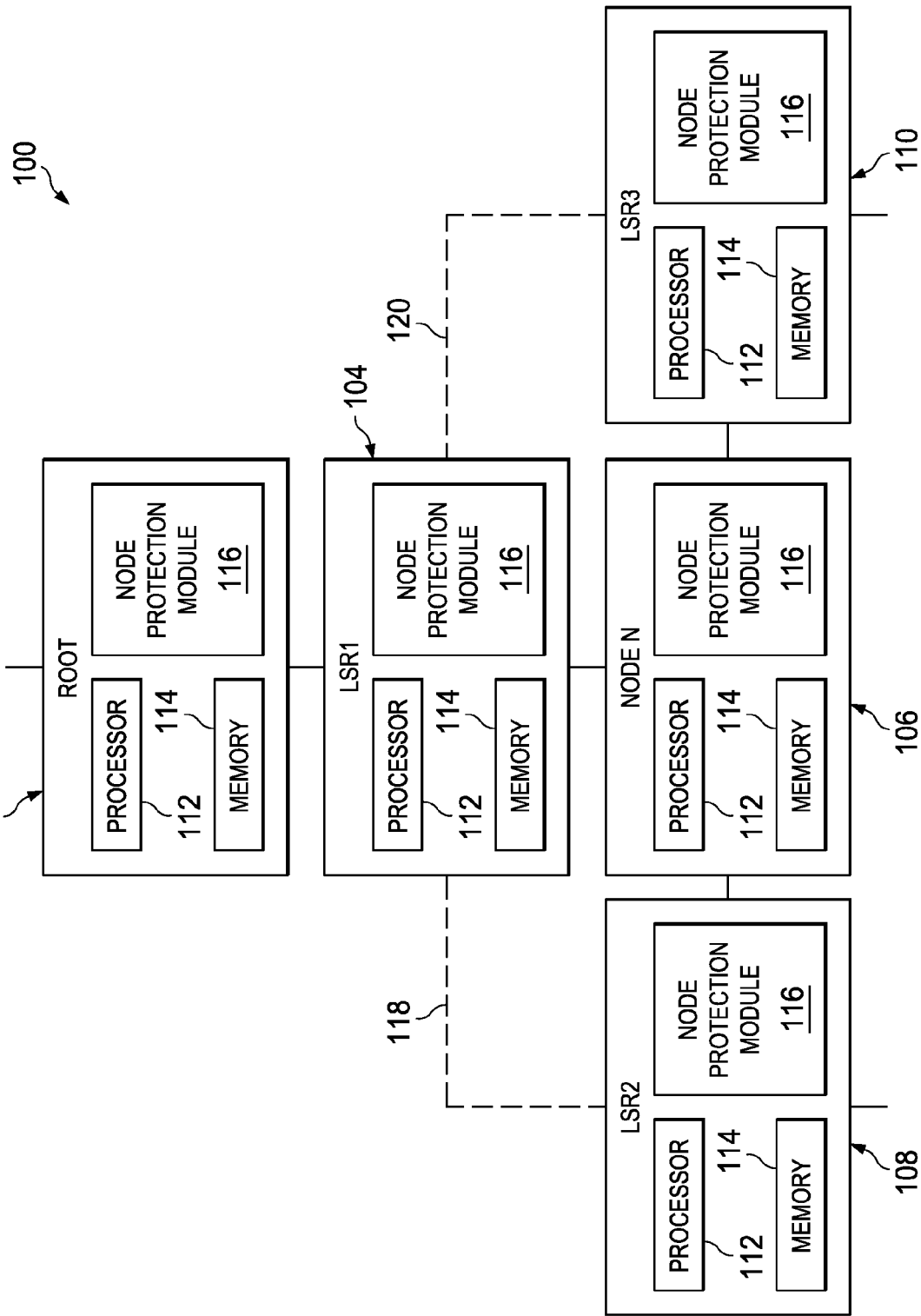
FIG. 1 is a simplified block diagram of a communication system in which a protected node is a transit node along a path to a root node environment in accordance with one embodiment of the present disclosure.

A method is provided in one example and includes receiving first address information from a protected node over a first label switched path having a first label (associated therewith). The first address information can be associated with a first network element, and a second label switched path has been previously established with the first network element. As used herein, the broad term 'address information' encompasses any type of characteristic, identifier, descriptor, field, or data more generally that can be associated with an address, a path, a route, or a network. The method further includes establishing a targeted session with the first network element. The term 'targeted session' is inclusive of any type of communication session that could exist in the network. The method also includes assigning a second label to the second label switched path, and sending the second label to the first network element over the targeted session.

In more particular embodiments, the method further includes sending protected node status information to the first network element over the targeted session. The protected node status information includes second address information associated with the protected node. In other embodiments, the protected node status information further includes an indication to the first network element that the second label associated with the second label switched path is not to be used unless the protected node is determined to be unreachable. In still other embodiments, the method further includes activating the second label assigned to the second label switched path based upon a determination that the protected node is unreachable due to failure of the protected node, disabling the first label associated with the first label switched path, and switching traffic to the second label switch path.

In another example, an apparatus is provided which includes a memory element configured to store data, a processor operable to execute instructions associated with the data, and a node protection module. The node protection module is configured to receive first address information from a protected node over a first label switched path having a first label associated therewith. The first address information is associated with a first network element. A second label switched path has been previously established with the first network element. The node protection module is further configured to establish a targeted session with the first network element, assign a second label to the second label switched path, and send the second label to the first network element over the targeted session. In a more particular embodiment, the apparatus is a router having merge point capability.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

Referring now to FIG. 1, FIG. 1 is a simplified block diagram of a communication system 100 in which the protected node is a transit node along the path to the root node environment in accordance with one embodiment of the present disclosure. Communication system 100 includes a root node 102, a first label switched router (LSR1) 104, a protected node N 106, a second label switched router (LSR2) 108, and a third label switched router (LSR3) 110. Root node 102 is coupled to LSR1 104, and LSR1 104 is further coupled to protected node N 106. Protected node N 106 is further coupled to LSR2 108 and LSR3 110. In the particular embodiment illustrated in FIG. 1, protected node N 106 is a transit node along the path to root node 102, and LSR1 104 is the upstream LSR because it is the first hop along the shortest path to reach the root address at root node 102. Protected node N 106 is a primary LSR for each of LSR2 108 and LSR3 110, and the connection between each of LSR2 108 and LSR3 110 to node N 106 is a primary upstream LSP for each of LSR2 108 and LSR3 110. When node N 106 is operational, upstream traffic from LSR2 108 and LSR3 110 are transmitted on the primary upstream LSP though node N 106. In the particular embodiment illustrated in FIG. 1, LSR1 104 and LSR2 108 have established a first backup LSP 118 therebetween for use if node N 106 has been detected as failed. In addition, LSR1 104 and LSR3 110 have established a second backup LSP 120 therebetween for use if node N 106 has been detected as failed. The first backup LSP 118 and second backup LSP 120 allow the traffic to traverse communication system 100 by bypassing the failed node N. In this case, LSR1 104 is functioning as a Point of Local Repair (PLR) of node N and LSR2 108 and LSR3 110 are functioning as Merge Points (MPTs) as will be further elaborated upon herein.

The embodiments described herein operate in the context of a data communication network including multiple network elements. Root node 102, LSR1 104, protected node N 106, LSR2 108, and LSR3 110 are network elements that facilitate multicast flows between hosts and/or sources in a given network. As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software.

In one implementation, root node 102, LSR1 104, protected node N 106, LSR2 108, and/or LSR3 110 include software to achieve (or to foster) the node protection procedures, as outlined herein in this Specification. Note that in one example, each of these elements can have an internal structure (e.g., a processor, a memory element, etc.) to facilitate some of the operations described herein. In other embodiments, these node protection procedures may be executed externally to these elements, or included in some other network element to achieve this intended functionality. Alternatively, root node 102, LSR1 104, protected node N 106, LSR2 108, and LSR3 110 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

In the particular embodiment illustrated in FIG. 1, each of root nodes 102, LSR1 104, protected node N 106, LSR2 108, and LSR3 110 include a processor 112, a memory element 114, and a node protection module 116. Memory elements 114 can store any appropriate information (e.g., routing tables, entries, network configurations, policies, forwarding trees, etc.) The node protection module 116 is configured to perform the node protection procedures as further described herein.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Figure 2:
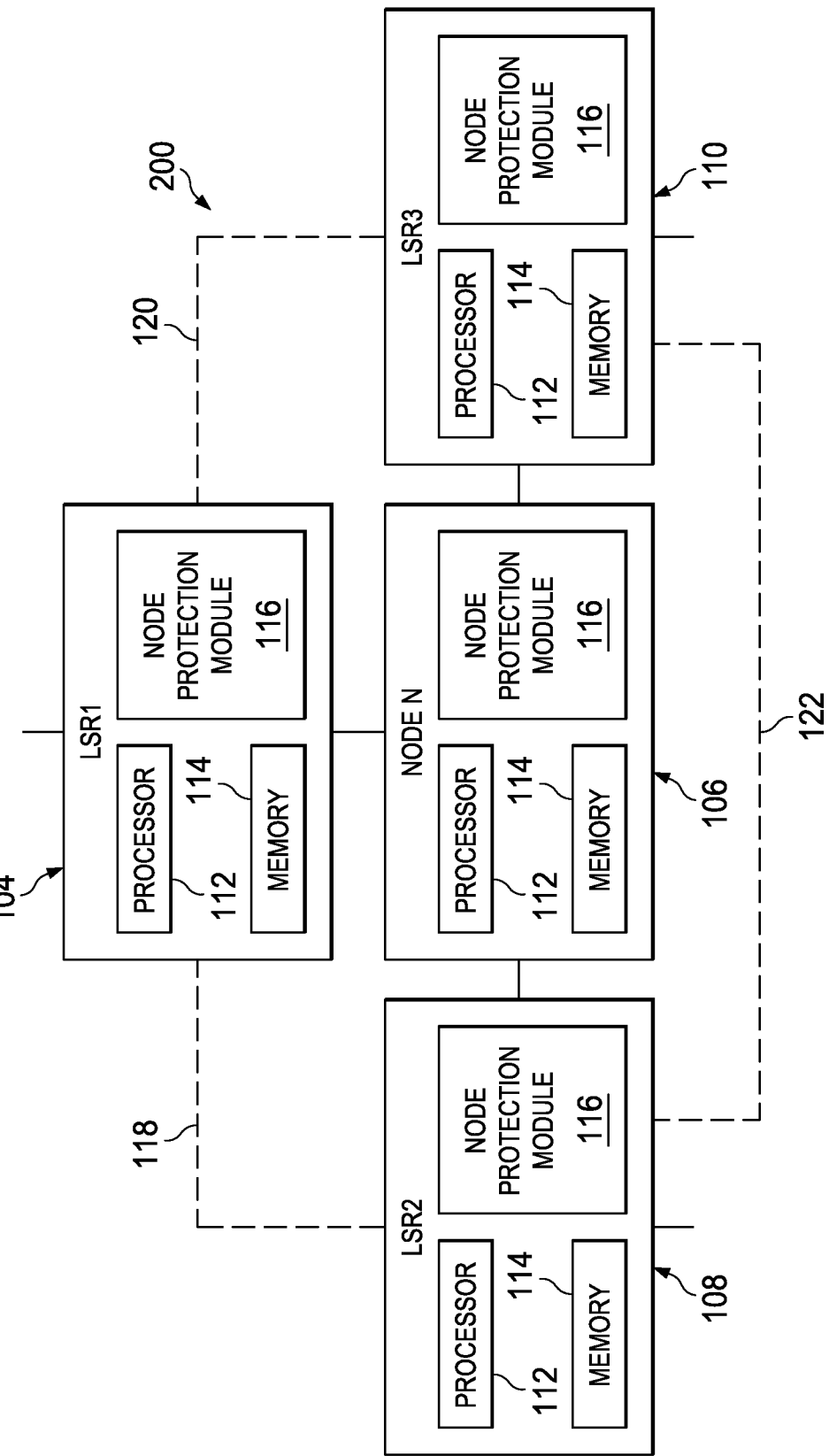
FIG. 2 is a simplified block diagram of a communication system in which the protected node is the root node of a multipoint-to-multipoint (MP2MP) Label Switched Path (LSP) in accordance with another embodiment of the present disclosure.

Referring now to FIG. 2, FIG. 2 is a simplified block diagram of a communication system 200 in which the protected node is the root node of a multipoint-to-multipoint (MP2MP) Label Switched Path (LSP) in accordance with another embodiment of the present disclosure. Communication system 200 includes the first label switched router (LSR1) 102, protected node N 106, the second label switched router (LSR2) 108, and the third label switched router (LSR3) 110. Protected node N 106 is further coupled to LSR2 108 and LSR3 110. Communication system 200 of FIG. 2 is similar in some respects to communication system 100 of FIG. 1; however, a significant difference is that in communication system 200 of FIG. 2 protected node N 106 is the root node of the MP2MP LSP. In the embodiment illustrated in FIG. 2, it is assumed that LSR1 104, LSR2 108, and LSR3 110 are all members of a MP2MP LSP for which node N 106 is the root node. Since node N 106 is the root of the MP2MP LSP, there is no upstream LSR and no 'single' PLR LSR for protecting node N 106. In order to protect node N 106, all the members of the MP2MP should participate in protecting node N by acting both as PLR LSRs and MPT LSRs. An LSR can act as a MPT for traffic coming from the other LSR(s) and it can act as PLR for traffic it is sending to the other LSR(s) as will be further elaborated upon herein.

For purposes of illustrating certain example techniques of communication systems 100 and 200, it is important to understand the communications that may be traversing the network. The following foundational information may be viewed as a basis from which the present disclosure may be properly explained. The embodiments described herein provide procedures to support node protection for Point-to-Multipoint and Multipoint-to-Multipoint Label Switched Path (MP-LSPs) built by multicast LDP ("Label Distribution Protocol"), or simply mLDP. Various embodiments allow a node running mLDP to be protected using a backup path to a node downstream of the protected node. In order to protect a particular node, node N, the Point of Local Repair (PLR) of node N should learn the identity of the one or more Label Switching Routers (LSR(s)) functioning as Merge Points (MPTs) for the protected node N such that traffic can be redirected to the MPTs in case node N fails. The Point of Local Repair (PLR) is an LSR that redirects the traffic to one or more Merge Point (MPT) LSRs in order to bypass a failed node N in a network. A Merge Point (MPT) is an LSR that merges the backup LSP with the primary LSP after node N fails. A particular LSR becomes a PLR or MPT based on its position in the network relative to the protected node. A node can be a PLR for one LSP and a MPT for another. This is a dynamic process and, thus, a particular node is configured to act as a PLR or MPT depending upon the role that it currently needs to perform.

It should be noted that there could be multiple MPT LSRs for a single MP-LSP node protection. Redirecting the traffic around the failed node N depends on existing Point-to-Point (P2P) LSPs originating from the PLR LSR to the MPT LSR(s) while bypassing the failed node N. The procedures to setup these P2P LSPs are outside the scope of the embodiments described herein, but it should be understood that in various embodiments these backup paths may be created using, for example, RSVP-TE (Resource ReSerVation Protocol-Traffic Engineering) P2P (Point-to-Point) LSP (Label Switched Path), LDP LFA (Loop Free Alternate) based techniques or any other suitable technique. As described below, node protection is enabled using mLDP messages that include local node information for a protected node and leaf nodes downstream of the protected node. It is to be understood that the term 'leaf node' as used herein refers to any node in a tree, including nodes at the end of the tree and nodes which have downstream nodes.

Different solutions may be used for a PLR LSR to learn the identity of downstream MPT LSR(s). One solution is based on 'tunneling' the MPT LSR(s) through node N via an existing LDP session towards the PLR. With this approach, as soon as node N fails, no signaling is possible between the MPT LSR(s) and PLR LSR(s). A direct consequence of this is that the MPT LSR(s) have no mechanism to signal a withdraw to the PLR to stop forwarding packets after the MPT LSR(s) have re-converged. The PLR has to associate a timer with the forwarding state towards the MPT LSR(s) to stop forwarding. Determining a suitable timer value is challenging since it depends on many variables which could change over time. After a PLR decides to stop forwarding towards a MPT LSR, another issue that arises is that of releasing the label that the PLR was using because the PLR in the approach identified previously, no mechanism to send a label release to the MPT LSR such that it can release the label and return it to the free pool.

Various embodiments described herein do not 'tunnel' the MPT LSR(s) information but instead explicitly signals the information from the MPT LSR(s) to the PLR LSR(s) via a Targeted LDP (T-LDP) session. Targeted LDP (T-LDP) sessions are established using unicast messages between particular LSRs, whereas non-targeted sessions are established using multicast messages that are sent to all of the LSRs on a subnet. T-LDP allows sessions to be established between LSRs that are not directly connected. If an LSR is more than one hop from its neighbor, it is not directly connected to its neighbor. For these non-directly connected neighbors, the LSR sends out a targeted "Hello" message as a User Datagram Protocol (UDP) packet as a unicast message specifically addressed to that LSR. The non-directly connected LSR responds to the "Hello" message and the two LSRs establish a T-LDP session. Although, the foregoing example describes the establishment of a T-LDP session between LSRs that are not directly connected, it should be understood that a T-LDP session may also be established between directly connected LSRs. The establishment of Targeted LDP (T-LDP) sessions between LSRs in an mLDP network is described in greater detail, for example, in "LDP Specification," RFC 5036. In contrast to establishing a T-LDP session, to establish a non-targeted session an LSR that is one hop from its neighbor, and thus directly connected, may send out LDP link "Hello" messages as UDP packets to all the routers on the subnet via multicast. A neighboring LSR may respond to the link "Hello" message, allowing the two LSRs to establish an LSR session.

Accordingly, in various embodiments the establishment of a T-LDP session between MPT LSR(s) and PLR LSR(s) is provided to allow explicit signaling of Merge Point (MPT) LSR information between either non-directly connected or directly connected LSRs. By using a T-LDP session to signal between the MPT LSR(s) and the PLR LSR(s), various embodiments described herein do not suffer from the problems faced by existing solutions. By having a T-LDP session with the PLR, existing mLDP features currently defined continue to function properly such as Make-Before-Break (MBB), Graceful Restart (GR), Typed Wildcard FEC support, etc. The benefits of various embodiments described herein are achieved at the expense of having an additional T-LDP session between an MPT and PLR LSR.

PLR Determination

In order for a Merge Point (MPT) to establish a T-LDP session with a PLR, the MPT should first learn the address of the Point of Local Repair (PLR) for a particular multipoint LSP. In accordance with various embodiments of the present disclosure, the protected node N assumes the responsibility of advertising the PLR address to the MPT. When the protected node N is not the root node of an MP2MP LSP, the PLR address for a MP LSP on node N is the address of the upstream LDP peer as further described below in the section entitled "Transit node procedure for PLR determination." If node N is the root node, all of the members of the MP2MP participate in protecting node N by acting as both a PLR and an MPT LSR as will be further described below in the section entitled "MP2MP root node procedure for PLR determination." Various embodiments described below assume that all of the participating nodes (the protected node N, the PLRs, and the MPTs) are enabled to support and implement one or more embodiments of the node protection features described herein.

Transit Node Procedure for PLR Determination

Referring again to FIG. 1, an embodiment of a procedure for determining a PLR in communication system 100 when protected node N 106 is a transit node along the path to root node 102 is described. In the embodiment of FIG. 1, protected node N 106 is the node being protected. In addition, a first backup path 118 is to be established between LSR1 104 and LSR2 108, and a second backup path 120 is to be established between LSR1 104 and LSR3 110. Node N 106 first uses the root address of the MP LSP to determine the upstream LSR for the MP LSP. The upstream LSR is designated as the PLR for node N 106. In at least one embodiment, node N 106 follows the procedures as described, for example, in Section 2.4.1.1 of "Label Distribution Protocol Extensions for Point-to-Multipoint and Multipoint-to-Multipoint Label Switched Paths," RFC 6388, for determining the upstream LSR.

In a particular embodiment, node N 106 determines the LDP peer that is node N 106's next-hop on the best path from node N 106 to root node 102. If there is more than one such LDP peer, only one of them is picked. The picked LDP peer is node N 106's "upstream LSR" for the MP LSP. When there are several candidate upstream LSRs, node N 106 selects one upstream LSR. The algorithm used for the upstream LSR selection may be determined locally in at least one embodiment. One particular procedure that node N 106 may use to determine the upstream LSR among a number of possible candidate LSRs is described in RFC 6388.

Such a procedure ensures that there is a single forwarder over the network for a particular LSP. In the particular embodiment illustrated in FIG. 1, node N 106 determines that the upstream LSR is LSR1 104 because LSR1 104 is the first hop along the shortest path to reach the root address associated with root node 102.

After determining the upstream LSR, node N 106 advertises the address of the upstream LSR to downstream members of the MP LSP that have announced support for node protection as the PLR address for node N 106. In the particular embodiment illustrated in FIG. 1, node N 106 advertises LSR1 104 as the PLR address to both LSR2 108 and LSR3 110. The LSR2 108 and LSR3 110 become MPTs for the node N 106. An embodiment of a messaging format for encoding of PLR address information is further described below with respect to FIG. 4.

MP2MP Root Node Procedure for PLR Determination

Referring again to FIG. 2, an embodiment of a procedure for determining a PLR in communication system 200 when protected node N 106 is the root node of a MP2MP LSP is described. In the embodiment of FIG. 2, LSR1 104, LSR2 108, and LSR3 110 are all members of a MP2MP LSP for which node N 106 is a root node of communication system 200. In addition, a first backup path 118 is to be established between LSR1 104 and LSR2 108, a second backup path 120 is to be established between LSR1 104 and LSR3 110, and a third backup path 122 is to be established between LSR2 108 and LSR3 110. Since node N 106 is the root of the MP2MP LSP, there is no upstream LSR for node N 106 and no single PLR LSR for protecting node N 106. In order to protect node N 106, the members of the MP2MP including LSR1 104, LSR2 108, and LSR3 110 each participate in protecting node N 106 by acting both as a PLR LSR and a MPT LSR. An LSR can act as MPT for traffic coming from the other LSR(s) and it can act as PLR for traffic it is sending to the other LSR(s). Since node N 106 knows the members of the MP2MP LSP, it can advertise the member list to its directly connected members, excluding the member it is currently sending to. For example, node N 106 advertises the list {LSR3, LSR1} to LSR2 108 excluding LSR2 from the list. Similarly, node N 106 advertises the list {LSR2, LSR3} to LSR1 104, and node N advertises the list {LSR1, LSR2} to LSR3 110. Instead of advertising a single PLR when node N 106 is not the root node as in FIG. 1, node N 106 advertises a list of PLRs to each LSR when node N 106 is the root node. In a particular embodiment, node N 106 advertises the list of PLRs using the messaging format for encoding of PLR address information as further described below with respect to FIG. 4.

It should be noted that in at least one embodiment, the described MP2MP root node protection procedure may not replace, but may instead be used in conjunction with, other root node redundancy procedures such as the Root Node Redundancy (RNR) procedures described in Section 7 of RFC 6388. Although the node protection procedures described in various embodiments herein enable the restoration of traffic for existing MP2MP LSPs after node failure, in at least one embodiment, a new root node is elected eventually in order to allow new MP2MP LSPs to be created.

Figure 3:
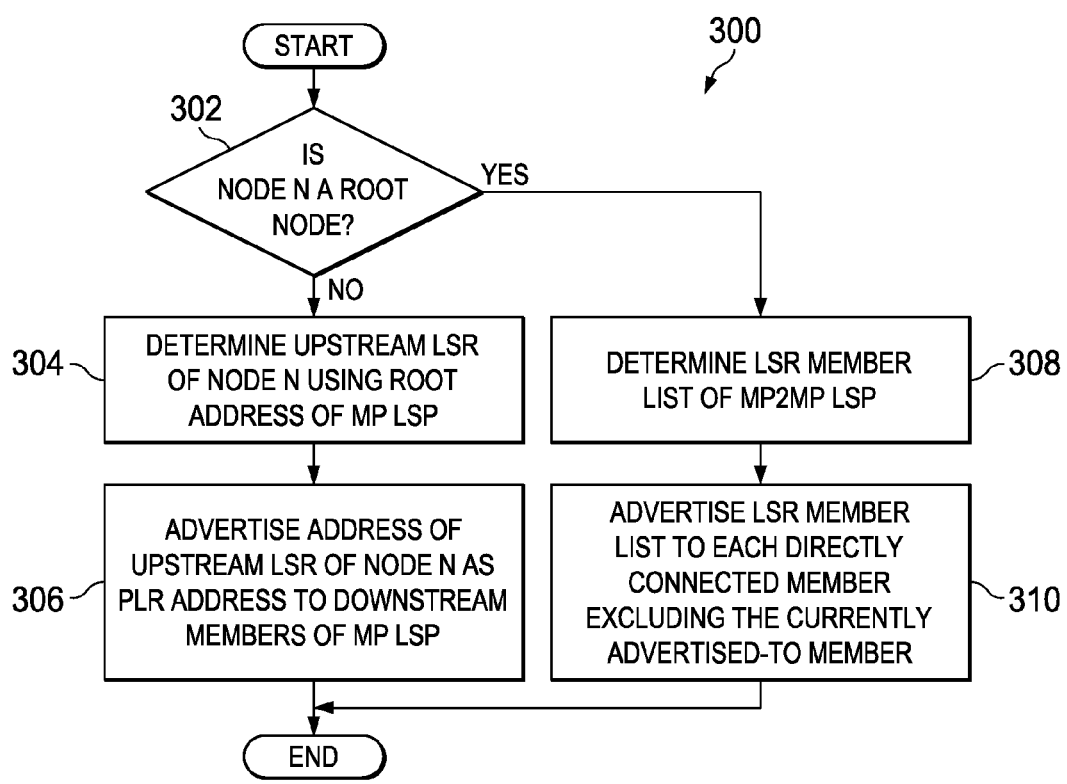
FIG. 3 is a simplified flowchart illustrating a procedure for determining a Point of Local Repair (PLR) by a protected node in accordance with an embodiment of the present disclosure.

FIG. 3 is a simplified flowchart illustrating a procedure 300 for determining a Point of Local Repair (PLR) by a protected node N 106 in accordance with another embodiment of the present disclosure. In 302, node N 106 determines whether it is the root node of a MP2MP LSP. If node N 106 determines it is not the root node, node N 106 is a transit node such as illustrated in FIG. 1 and the procedure continues to 304. In 304, node N 106 determines the upstream LSR using the root address of the MP LSP and designates the upstream LSR as the PLR for node N 106. In at least one embodiment, node N 106 follows the procedures as described, for example, in Section 2.4.1.1 of RFC 6388. As previously described, in communication system 100 illustrated FIG. 1 node N 106 determines that LSR1 104 is the upstream LSR.

In 306, node N advertises the address of the upstream LSR as the PLR address to downstream members of the MP LSP that have announced support for node protection. As previously discussed, in the example illustrated in FIG. 1, node N 106 advertises LSR1 104 as the PLR address to both LSR2 108 and LSR3 110, and LSR2 108 and LSR3 110 become MPTs for the node N 106. The procedure 300 then ends.

If node N 106 determines in 302 that node N 106 is a root node of a MP2MP LSP such as illustrated in FIG. 2, the procedure continues to 308. In 308, node N 106 determines the LSR member list of the MP2MP LSP. In the particular embodiment illustrated in FIG. 3, the LSR member list includes LSR1 104, LSR2 108, and LSR3 110. In 310, node N 106 advertises a LSR member list to each member LSR that is directly connected to node N 106 excluding the currently advertised-to member. In the example illustrated in FIG. 2, node N 106 advertises the list {LSR3, LSR1} to LSR2 108 excluding LSR2 from the list. Similarly, node N 106 advertises the list {LSR2, LSR3} to LSR1 104, and node N 106 advertises the list {LSR1, LSR2} to LSR3 110. The procedure 300 then ends.

PLR Information Encoding

Figure 4A:
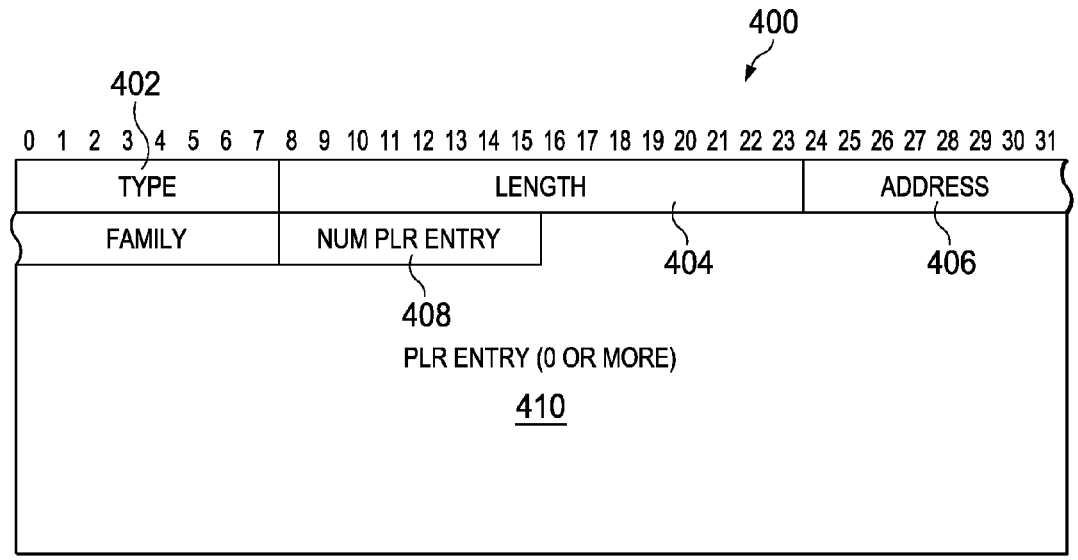
FIGS. 4A-4B are simplified diagrams of a PLR Status Value Element of a Label Distribution Protocol (LDP) notification message for encoding and conveying PLR information by a protected node in accordance with an embodiment of the present disclosure.
Figure 4B:
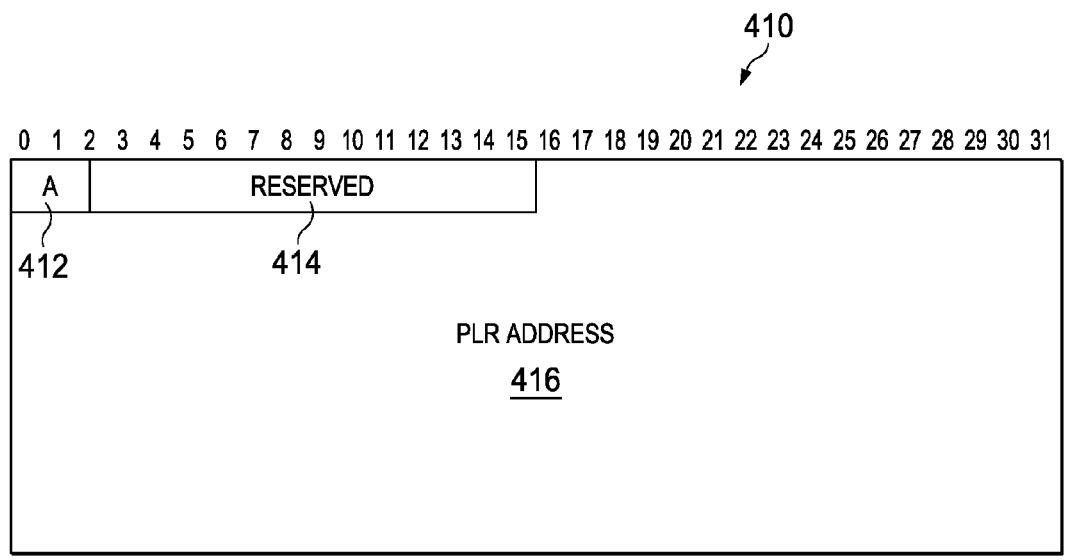

In at least one embodiment, the upstream LSR address is conveyed by the protected node N 106 to an MPT via an LDP Notification message. FIGS. 4A-4B are simplified diagrams of a PLR Status Value Element 400 of an LDP notification message for encoding and conveying PLR information by a protected node N 106 in accordance with an embodiment of the present disclosure. The LDP Notification message includes an indication of multipoint (MP) status, where the MP status contains the PLR Status Value Element. Protected node N 106 uses the PLR Status Value Element 400 of the LDP Notification message to convey upstream LSR address information, and thus the PLR address information, to LSRs.

FIG. 4A illustrates an embodiment of a PLR Status Value Element 400 of the LDP notification message. The PLR Status Value Element 400 includes a Type field 402, a Length field 404, an Address Family field 406, a Num PLR entry field 408, and a PLR entry field 410. The Type field 402 is set to Type=3 to indicate a PLR Status Value Element. In a particular embodiment, the Type=3 designation is assigned by the Internet Assigned Numbers Authority (IANA). The Length field 404 encodes the length of the Status Value following the Length field. The encoded Length varies based on the Address Family and the number of PLR entries. The Address Family field 406 is a two-octet quantity containing a value from IANA's "Address Family Numbers" registry that encodes the address family for the PLR Address encoded in the PLR entry. The Num PLR entry field 406 indicates the number of PLR entries encoded in the PLR Status Value Element 400. The PLR entry field 410 encodes the PLR address information and is further illustrated in FIG. 4B.

Referring now to FIG. 4B, the PLR Entry field 410 includes an "A bit" 412, a Reserved field 414, and a PLR address field 416. The A bit 412 is encoded as 0=Withdraw and 1=Add, the Reserved field 414 is fifteen (15) bits that are set to zero on transmit and ignored on receipt, and the PLR address field 416 encodes zero or more PLR Address according to Address Family field 406 encoded in the PLR Status Value Element 400. The size of a "PLR Entry" is the 2 octets ("A bit+Reserved")+PLR address length. The length of the PLR address depends upon the Address Family as encoded in the PLR Status Value Element 400. The size of a "PLR entry" is 6 octets and 18 octets respectively for an IPv4 PLR address and an IPv6 PLR address.

If the PLR address on node N 106 changes for a given MP LSP, node N 106 triggers a new PLR Status to update the MPT(s). Node N 106 can advertise or withdraw a given PLR from its PLR set by setting the "A bit" 412 to 1 or 0 respectively in the corresponding PLR entry. Removing a PLR address is likely due to a link failure such as further described herein. To remove all PLR addresses belonging to the encoded Address Family, node N 106 encodes the PLR Status Value Element 400 with no PLR entry and "Num PLR entry" field is set to zero. Along with the PLR Status Value Element 400, an MP Forwarding Equivalence Class (FEC) type-length-value (TLV) is included in the LDP Notification message so that a receiver is able to associate the PLR Status with the MP LSP.

Using a Targeted LDP (T-LDP) Session for Node Protection

In accordance with various embodiments, a T-LDP session is established between one or more MPT LSR(s) and one or more PLR LSR(s) to allow explicit signaling of Merge Point (MPT) LSR information over one or more backup paths previously established between the MPTs and PLRs in the case that a protected node N 106 or link therewith fails.

Figure 5:
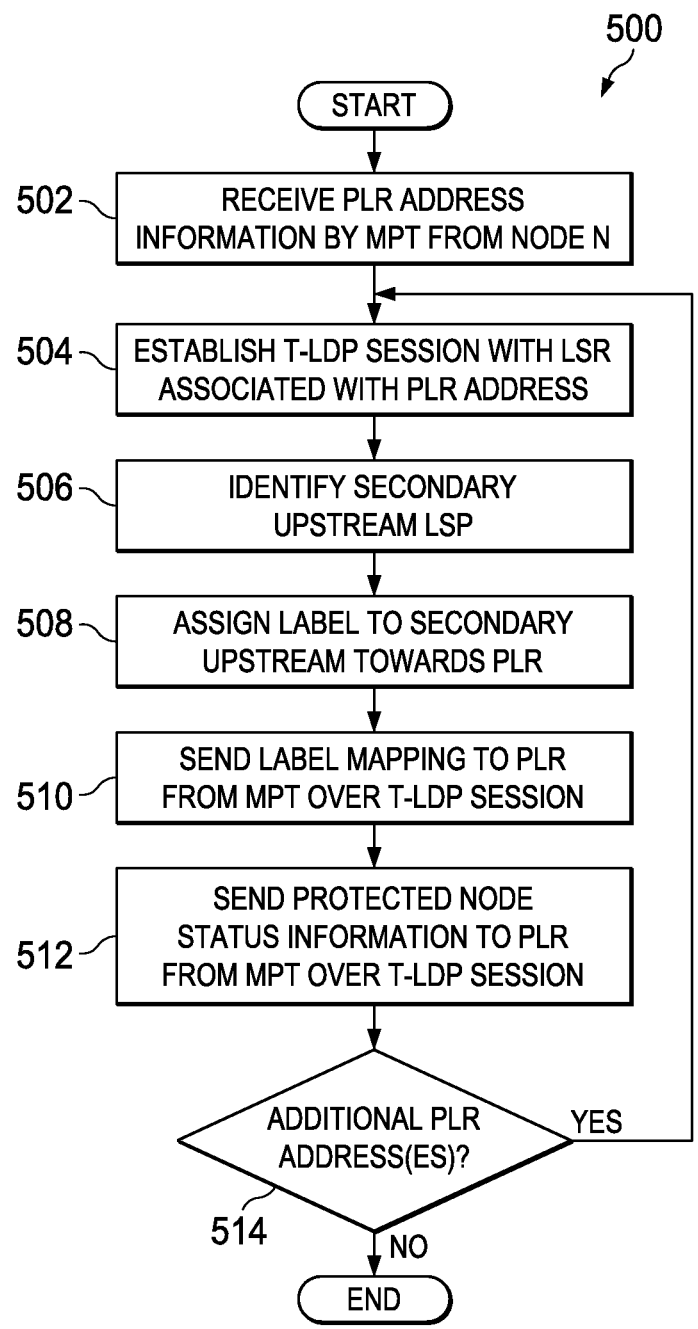
FIG. 5 is a simplified flowchart illustrating a procedure for signaling of Merge Point (MPT) label switched router (LSR) information from an MPT to one or more PLRs using a Targeted LDP (T-LDP) session in accordance with an embodiment of the present disclosure.

FIG. 5 is a simplified flowchart illustrating a procedure 500 for signaling of MPT LSR information from an MPT to one or more PLRs using a Targeted LDP (T-LDP) session in accordance with an embodiment of the present disclosure. In the embodiment of FIG. 5, one or more backup paths have been previously established between the MPT and one or more PLRs. In 502, the MPT receives PLR address information from node N 106 over the primary upstream LSP. In at least one embodiment, node N 106 determines the PLR address information using the procedures as described above with respect to FIGS. 1-3 and conveys the PLR address information as a PLR MP Status in an LDP notification message containing the PLR Status Value Element 400 of FIGS. 4A-4B. The receipt of a PLR MP Status (with PLR addresses) for a MP LSP on a receiving LSR makes it an MPT for node protection. Referring again to FIG. 1 as an example for the purposes of this discussion, LSR2 108 and LSR3 110 receive PLR address information from node N 106 which includes the address of LSR1 104. This designates LSR1 104 as the PLR for node N 106, and LSR2 108 and LSR3 110 as MPTs for node N 106.

In 504, a Targeted LDP (T-LDP) session is established between the MPT and the PLR associated with the first of the PLR address(es) if a T-LDP session has not already been established therebetween. In at least one embodiment, the T-LDP session is established using the procedures as described in Napierala, M. and E. Rosen, "Using LDP Multipoint Extensions on Targeted LDP Sessions", draft-napierala-mpls-targeted-mldp-02, October 2011. As previously discussed, to establish a T-LDP session between a first LSR and a second LSR, the first LSR sends out a targeted "Hello" message as a User Datagram Protocol (UDP) packet as a unicast message specifically addressed to the second LSR. The second LSR responds to the "Hello" message and the two LSRs establish a T-LDP session. In at least one embodiment, the T-LDP session is initiated with the PLR by the MPT. In still other embodiments, the T-LDP session may be initiated by the PLR with the MPT.

In 506, the MPT identifies a previously created secondary upstream LSP with the PLR. The secondary upstream LSP can be used as a backup LSP in the event that the protected node N fails. In at least one embodiment, the secondary upstream LSP is previously created via deployment of unicast Node protection. In 508, the MPT assigns a Label Lpx to FEC <R,X> to the secondary upstream LSP towards the PLR in which R identifies the root node and X is the opaque value that uniquely identifies the LSP. In 510, the MPT sends the FEC Label Mapping for the secondary LSP to the PLR over the T-LDP session. In various embodiments, an LSP identifier may include one or more of a number, an address, or any other suitable identifier.

In 512, the MPT sends protected node status information to the PLR over the T-LDP session. The protected node status information includes the address of the node being protected. In the embodiment illustrated embodiment, the protected node status information includes the address associated with node N 106. It is not preferable that a PLR is always sending traffic to an MPT over the backup P2P LSP. In some embodiments, the PLR should only send traffic over the backup P2P LSP if node N fails. In various embodiments, the receipt of a FEC Label Mapping alone over the T-LDP session from the MPT by the PLR conveys the label information but does not convey the node being protected. The information about a protected node is known to the MPT LSR and it is preferable that it is communicated to the PLR as well. For this reason, the FEC Label Mapping (FEC <R,X>: Lpx) sent by the MPT over the T-LDP session to the PLR may include a Status TLV with MP Status including a LDP MP status Value Element called the "Protected Node Status Value Element." The Protected Node Status Value Element is used to specify the address of the node being protected and is further described with respect to FIG. 6 below. The protected node status information sent by the MPT provides an indication to the PLR that the label binding associated with the particular backup LSP is not to be used unless node N 106 is determined to be unreachable.

In 514, it is determined if there are any additional PLR address(es) that where received from node N by the MPT. If it is determined in 514 that there are additional PLR address(es), the MPT repeats 504, 506, 508, 510, and 512 for each additional PLR address. If it is determined in 514 that there is no additional address(es), the procedure 500 ends. It should be understood in various embodiments that the procedure 500 illustrated in FIG. 5 may be performed by each MPT within a network such that each MPT in the network establishes a T-LDP session with one or more PLRs.

Referring again to FIG. 1 by way of example, it is assumed that both LSR2 108 and LSR3 110 are MPTs and have established a T-LDP session with the PLR being LSR1 104. Both LSR2 and LSR3 have an FEC <R,X> with an upstream LSR, node N 106, and a label Ln assigned to FEC towards N. The MPTs LSR2 108 and LSR3 110 can each identify a previously created secondary upstream LSR (using the received PLR address from node N 106) and assign a Label Lpx to FEC <R,X> towards PLR for it. The MPTs can perform this procedure each PLR address that was learned for the MP LSP. In this example, the MPTs can have a FEC <R,X> with two local labels associated with it. Label Ln that was assigned to node N 106 via the normal mLDP procedures, and Label Lpx that was assigned for the PLR (LSR1 104) for the purpose of node protecting the MP LSP via node N 106. It should be noted that when protected node N 106 is a MP2MP root node, there can be an upstream LSR for each PLR address that was advertised along with a unique Label Lpx.

Figure 6:
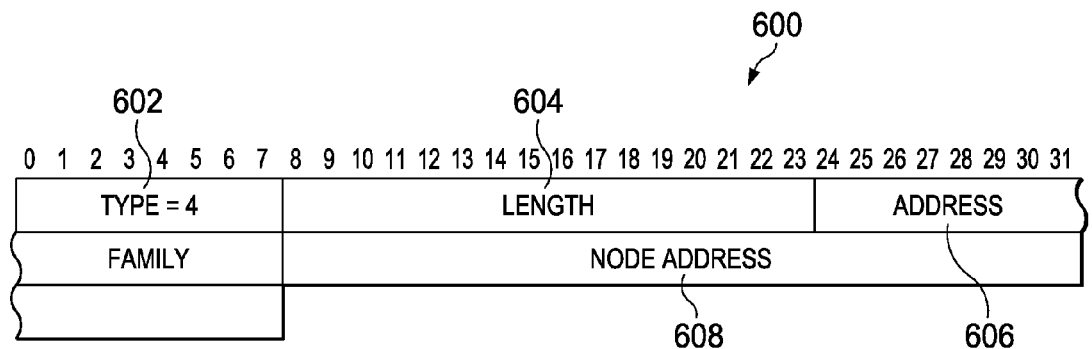
FIG. 6 is a simplified diagram illustrating a Protected Node Status Value Element for communicating an address of a protected node to a PLR in accordance with another embodiment of the present disclosure.

FIG. 6 is a simplified diagram illustrating a Protected Node Status Value Element 600 for communicating an address of a protected node to a PLR in accordance with another embodiment of the present disclosure. The Protected Node Status Value Element 600 includes a Type field 602, a Length field 604, an Address Family field 606, and a Node Address Field 608. The Type field is set to Type=4 to indicate a Protected Node. In a particular embodiment, the Type=4 designation may be assigned by IANA. The Length field 604 encodes the length of the Address Family field 606 following the Length field 604. The encoded length varies based on the Address Family and is 4 octets and 16 octets respectively for an IPv4 address and an IPv6 address. The Address Family field 606 is a two octet quantity containing a value from IANA's "Address Family Numbers" registry that encodes the address family for the Node Address field 608. The Node Address field 608 includes the protected node address encoded according to the Address Family field 606.

When a PLR receives a Label Mapping for FEC <R,X> that includes a Protected Node Status, it can only use that label binding once the node advertised in the Protected Node Status Value Element 600 becomes unreachable. If the LSP is a MP2MP LSP, the PLR assigns a Label Mapping for the upstream MP2MP FEC Element to the MPT for FEC <R,X> as described in Section 3 of RFC 6388. This label binding on the MPT is only used once node N 106 becomes unreachable. Procedures to determine if a node is unreachable are generally a local decision and are not discussed in detail in this Specification. In at least one embodiment, a typical link failure or Bidirectional Forwarding Detection (BFD) can be used to determine and detect node unreachability.

Link or Node Failure

Figure 7:
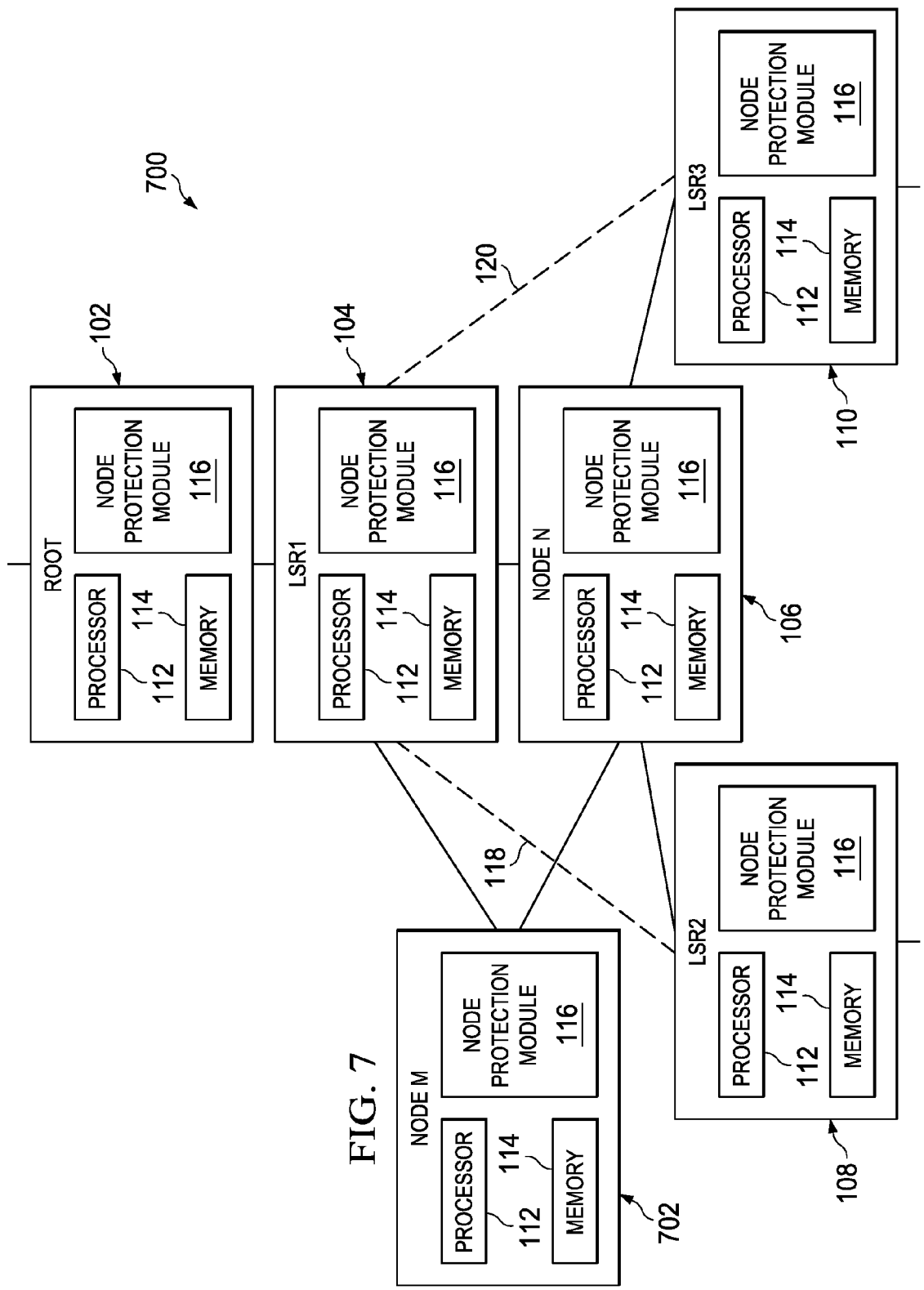
FIG. 7 is a simplified block diagram of a communication system illustrating link and/or node failure in which the protected node is a transit node along the path to the root node in accordance with an embodiment of the present disclosure.

Referring now to FIG. 7, FIG. 7 is a simplified block diagram of a communication system 700 illustrating link and/or node failure in which the protected node is a transit node along the path to the root node in accordance with an embodiment of the present disclosure. Communication system 700 of FIG. 1 is similar to communication system 100 of FIG. 1 in that it includes root node 102, LSR1 104, node N 106, LSR2 108, and LSR3 110. However, communication system 700 further includes a node M 702 connected between LSR1 104 and node N 106. In the particular embodiment illustrated in FIG. 7, node M 702 includes a processor 112, a memory element 114, and a node protection module 116. Node M 702 functions as a backup node to protect the link between LSR1 104 and node N 106 in case the link between LSR1 104 and node N 106 fails. Root node 102 is coupled to LSR1 104 and LSR1 104 is further coupled to protected node N 106 and node M 702. Protected node N 106 is further coupled to LSR2 108, LSR3 110, and node M 702. If the link between LSR1 104 and node N 106 fails, traffic can be routed from LSR1 104 to node N 106 through node M 702. A first backup LSP 118 is established between LSR1 104 and LSR2 108, and a second backup LSP 120 is established between LSR1 104 and LSR3 110. The first backup LSP 118 allows traffic to be between LSR1 104 and LSR2 108 if node N 106 itself fails. In this way, node N 106 is protected from both node and link failure.

In the embodiment illustrated in FIG. 7, it is assumed that LSR1 104 is the PLR for protected node N 106, and LSR2 108 and LSR3 110 are MPTs for protected node N 106. If LSR1 104 discovers that node N 106 is unreachable, LSR1 104 cannot determine if it is the link between LSR1 104 and protected node N 106 that has failed or if it is protected node N 106 that has failed. In FIG. 7, the link between LSR1 104 and node N 106 is also protected using link protection via node M 702. In a particular embodiment, the link between LSR1 104 and node N 106 is protected via node M 701 using Fast ReRoute (FRR) link protection as described in "Fast Reroute Extensions to RSVP-TE for LSP Tunnels", RFC 4090. In at least one embodiment, LSR1 104 may potentially invoke two protection mechanisms at the same time, redirection of traffic due to link protection via node M 702 to node N 106, and for node protection directly to LSR1 104 and LSR2 108 via the first backup LSP 118.

If only the link between LSR1 104 and node N 106 has failed, LSR2 108 and LSR3 110 can each receive duplicate packets due to the two protection mechanisms without further measures to prevent this occurrence. To prevent duplicate packets from being forwarded to LSR2 108 and LSR3 110, either the primary upstream LSRs or the secondary upstream LSRs should be forwarding MPLS packets, but never both at the same time. The selection between the primary upstream LSR or (one or more) secondary upstream LSRs is based on the reachability of node N 106. As long as node N 106 is reachable, node N 106 is the primary upstream LSR by which the MPLS packets are forwarded. Once node N 106 becomes unreachable, the secondary upstream LSRs, first backup LSP 118 and second backup LSP 120, that were installed for node protection are activated. It should be understood that detecting node N 106 as being unreachable is a local decision and is not described in detail in this Specification. In at least one embodiment, typical link failure or Bidirectional Forwarding Detection (BFD) can be used to determine and detect node unreachability.

Re-Convergence after Node/Link Failure

Figure 8:
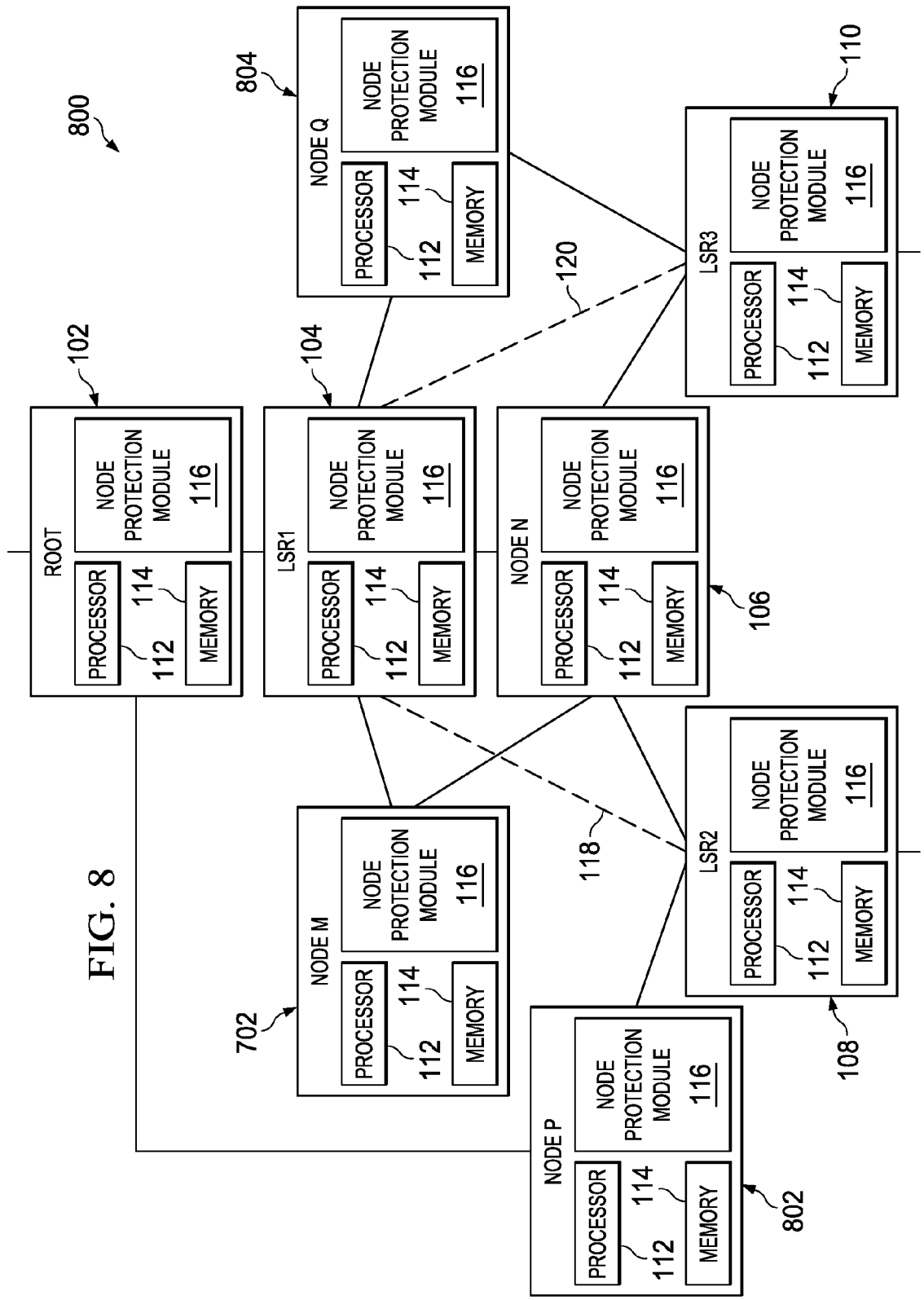
FIG. 8 is a simplified block diagram of a communication system illustrating re-convergence after link and/or node failure in which the protected node is a transit node along the path to the root node in accordance with an embodiment of the present disclosure.

Referring now to FIG. 8, FIG. 8 is a simplified block diagram of a communication system 800 illustrating re-convergence after link and/or node failure in which the protected node is a transit node along the path to the root node in accordance with an embodiment of the present disclosure. Communication system 800 is similar to that of communication system 700 of FIG. 7 except that communication system 800 of FIG. 8 further includes node P 802 and node Q 804. Node P 802 and node Q are nodes on the new primary path after failure of node N 106 and re-convergence. Node P 802 is connected between root node 102 and LSR2 108, and node Q 804 is connected between LSR1 104 and LSR3 110. As discussed, node N 106 is the protected node and node M 702 is a backup node to protect the link between LSR1 104 and node N 106. The first backup LSP 118 is established between LSR1 104 and LSR2 108, and the second backup LSP 120 is established between LSR1 104 and LSR3 110.

In the context of an example involving FIG. 8, assume that LSR1 104 has detected that node N 106 is unreachable and invokes one or more embodiments of both the link protection and node protection procedures as described in this Specification. LSR1 104 is acting as PLR and sending traffic over both the backup P2P LSP to node N 106 via node M 702, and the P2P LSPs of the first backup LSP 118 and second backup LSP 120, respectively, directly to LSR2 108 and LSR3 110. LSR2 108 and LSR3 are acting as MPT LSRs. The procedures followed for re-convergence vary depending on whether the link between LSR1 104 and node N 106 has failed or node N 106 itself has failed as further described below.

Node Failure

In the context of the architecture of FIG. 8, if node N 106 has failed, both LSR2 108 and LSR3 110 can change the primary upstream LSR, node N 106, to the secondary upstream LSR, LSR1 104, due to node N being unreachable. With that, the label bindings previously assigned to LSR1 104 are activated on the MPTs LSR2 108 and LSR3 110, and the label binding to node N 106 can be disabled. Traffic is then switched over to the label bindings that were installed for node protection such that traffic is switched over to the first backup LSP 118 and second backup LSP 120.

Link Failure

In the example architecture of FIG. 8, if the link between LSR1 104 and node N 106 has failed, both LSR2 108 and LSR3 110 would not change the primary upstream LSR because node N is still reachable by LSR2 108 and LSR3 110. LSR2 108 and LSR3 110 can receive traffic over two different bindings, the primary label binding assigned to node N 106 due to the link protection via node M 702 as well as over the binding assigned to LSR1 104 for the node protection. Since the secondary upstream LSRs have not been activated, the traffic received due to node protection can be dropped. Node N 106 can re-converge and update LSR2 108 and LSR3 110 with the information that the PLR address of LSR1 104 is no longer applicable and should be removed using the PLR information encoding procedure described above with respect to FIGS. 4A-4C. In response, LSR2 108 and LSR3 110 can send a Label Withdraw to LSR1 104 to withdraw the label binding. Withdrawal of the label binding stops the traffic from being forwarded over the backup P2P LSPs for node protection. LSR1 104 responds back with a Label Release as soon as the binding has been removed.

Switching to New Primary Path

In the architecture of FIG. 8, the network can eventually re-converge and a new best path to the root can be found by LSR2 108 and LSR3 110. LSR2 108 finds that node P 802 is its new primary upstream LSR to reach root node 102, and LSR3 110 finds that node Q 804 is its new primary upstream LSR to reach root node 102. It should be noted that although the current active upstream LSR can either be node N 106 or LSR1 104 depending on whether there has been a link or node failure, it does not matter for the procedures followed by LSR2 108 and LSR3 110 to switch to a new primary upstream node. In at least one embodiment, both LSR2 108 and LSR3 119 use the Make-Before-Break (MBB) procedures as described in Section 8 of RFC 6388 to switch to the new primary upstream node. As soon as the new primary upstream LSRs node P 802 and node Q 804 are activated, a Label Withdraw message is sent to the old upstream LSR. It should be noted that in various embodiments an upstream LSR switchover from a T-LDP neighbor to a directly connected LDP neighbor is no different when compared to switching between two directly connected neighbors. After the Label Withdraw message has been received by LSR1 104 or node N 106, forwarding would stop and a Label Release can be sent.

When it is determined that after re-convergence there is no more interest in the T-LDP session between the MPT and the PLR, the T-LDP session may be taken down. It is possible in some situations that having no more interest in the T-LDP session is temporarily due to link flapping. In order to avoid the T-LDP session from flapping, it is recommended in some embodiments to apply a delay before tearing down the T-LDP session. Determining the delay is a local implementation matter.

Figure 9:
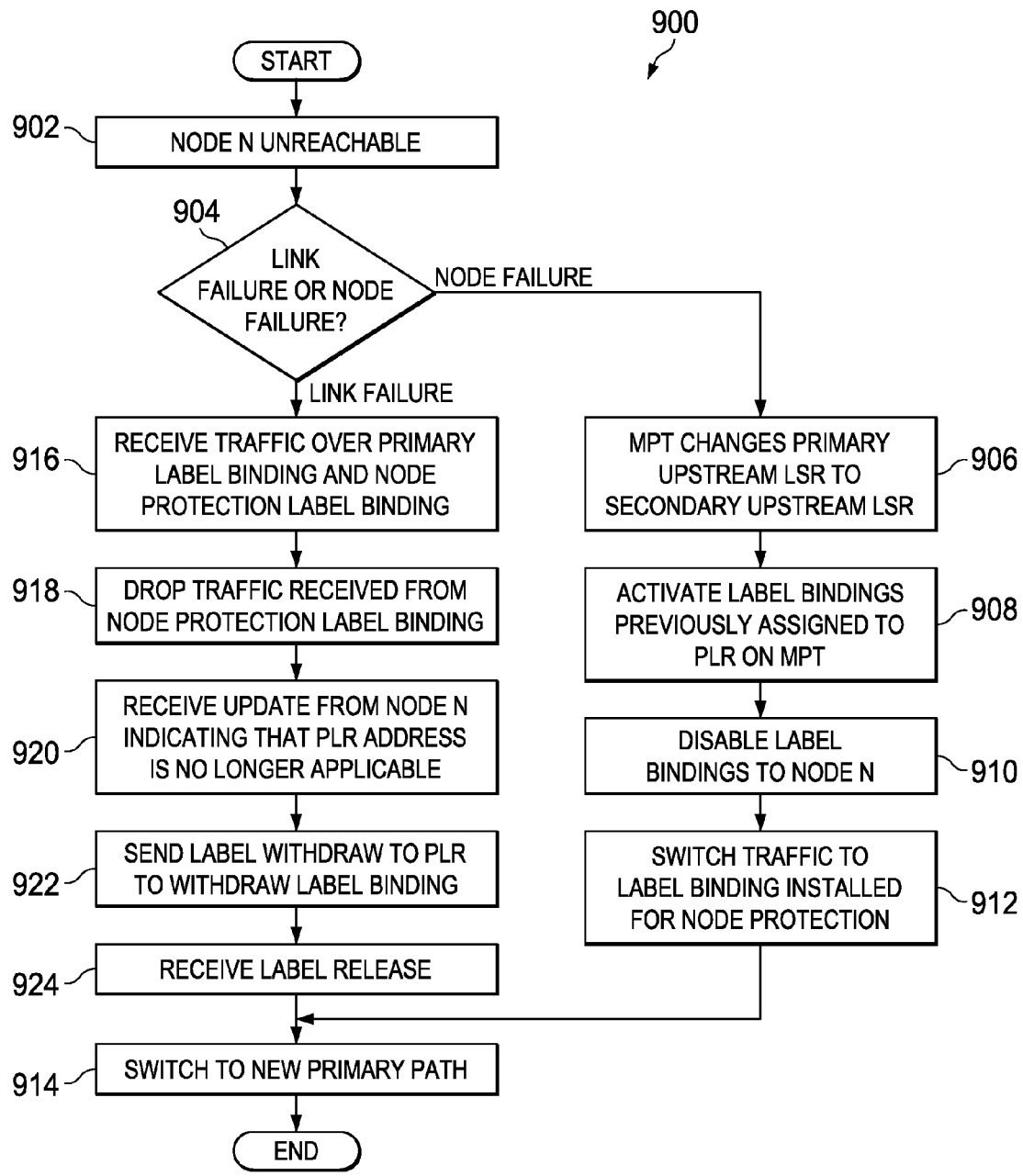
FIG. 9 illustrates a simplified flowchart of a procedure for re-convergence after link and/or node failure in which the protected node is a transit node along the path to the root node in accordance with an embodiment of the present disclosure.

FIG. 9 illustrates a simplified flowchart of a procedure 900 for re-convergence after link and/or node failure in which the protected node is a transit node along the path to the root node in accordance with an embodiment of the present disclosure. In 902, it is determined that node N 106 is unreachable. In a particular embodiment, the LSR1 104 of FIG. 8 has detected that node N 106 is unreachable and invokes one or more embodiments of both the link protection and node protection procedures as described in this Specification. In 904, it is determined whether node N 106 is unreachable due to either a link failure or node failure.

If it is determined that node N 106 is unreachable due to a link failure, the procedure 900 continues to 906. In 906, the MPT changes the primary upstream LSR to the secondary upstream LSR. For example, in the embodiment of FIG. 8, both LSR2 108 and LSR3 110 can change the primary upstream LSR, node N 106, to the secondary upstream LSR, LSR1 104, due to node N being unreachable. In 908, the label bindings previously assigned to the PLR for the backup LSP(s) are activated on the MPT. In 910, the label bindings to node N 106 are disabled. In 912, traffic is switched to the label bindings installed for node protection. In the embodiment illustrated in FIG. 8, traffic is switched to the label bindings installed for the first backup LSP 118 and second backup LSP 120. In 914, traffic from the MPT is switched to a new primary path once a new primary path has been established after re-convergence and the procedure 900 ends.

If it is determined in 904 that node N 106 is unreachable due to the failure of the link between the PLR (LSR1 104 in the example of FIG. 8) and node N 106, the procedure 900 continues to 916. In 916, the MPT receives traffic over both the primary label binding assigned to node N 106 due to the link protection via node M 702 and the node protection label binding assigned to the PLR (LSR1 104). In 918, the MPT drops the traffic received from the node protection label binding. In 920, the MPT receives an update from node N 106 after re-convergence of node N indicating that the PLR address (the address of LSR1 104 in the example of FIG. 8) is no longer applicable and should be removed. In 922, the MPT sends a Label Withdraw message to the PLR indicating to the PLR to withdraw the label binding associated with the backup LSP. This Label Withdraw message can stop the traffic from being forwarded over the backup P2P LSPs for node protection. In 924, the MPT receives a Label Release message from the PLR, which is sent as soon as the label binding has been removed. The Label Release message indicates to the MPT that the label binding has been removed. The procedure 900 then continues to 914 in which traffic from the MPT is switched to the new primary path established after re-convergence and the procedure 900 ends.

mLDP Capabilities of Participating LSRs for Node Protection

In order to implement In the node protection procedures described herein, the participating nodes including the PLRs, the MPTs, and the protected LSR (protected node) should in at least one embodiment possess the following capabilities as described below. In order to describe the capabilities of the participating LSRs, the following discussion is organized per the role of the in the network i.e., Point of Local Repair (PLR), Merge Point (MPT), and projected node as illustrated in FIGS. 1-9 herein.

PLR Capability

A PLR node should handle the following conditions in at least one embodiment:
1. Accept an incoming T-LDP session from the MPT LSR.
2. Support the receipt of a "Protected Node Status Value Element" status in an MP Status TLV over the T-LDP session.
3. Upon node failure detection, be capable of switching traffic towards one or more MPT(s) over P2P LSP (bypassing node N) using the labels previously advertised for MP LSPs over the T-LDP session.

Figure 10:
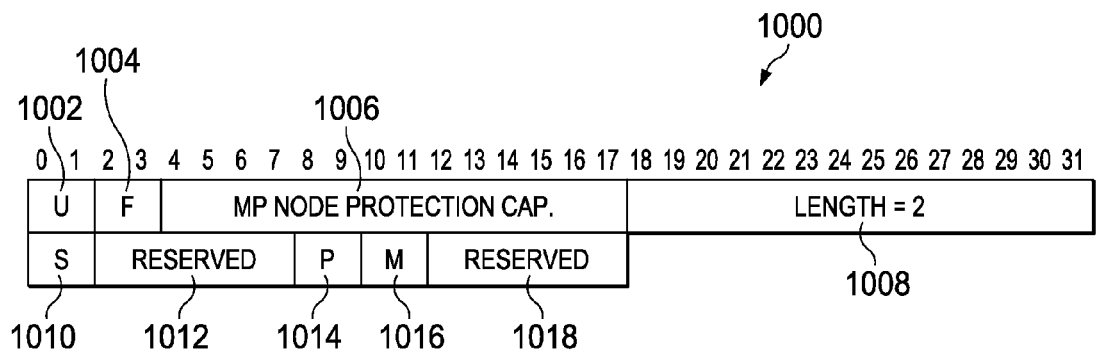
FIG. 10 is a simplified diagram of a Node Protection Capability Message in accordance with an embodiment of the present disclosure.

In various embodiments, an LSR capable of performing these actions can advertise itself as PLR capable in a Node Protection Capability message as will be further described with respect to FIG. 10. This is a unidirectional capability announced from PLR to the protected LSR.

MPT Capability

An MPT node should handle the following conditions in at least one embodiment:
1. Support the receipt of "PLR Status Value Element" in a MP Status TLV from a protected node N.
2. Support transmitting a "Protected Node Status Value Element" in an MP Status TLV to a PLR.

In various embodiments, an LSR capable of performing these actions can advertise itself as MPT capable in a Node Protection Capability message as will be further described with respect to FIG. 10. This is a unidirectional capability from MPT to the protected LSR.

The Protected LSR

A protected node should handle the following conditions in at least one embodiment:
1. Determine the PLR and MPT capability for directly connected upstream and downstream LSRs for a given MP FEC.
2. Support transmitting of a "PLR Status Value Element" in a MP Status TLV to one or more downstream MPT LSRs.

The protected LSR does not need to advertise any capability for mLDP Node Protection because it does not need to receive any of the defined MP Status values as described above. However, the protected node does play an important role in the signaling and setup of the node protection. For a given FEC, the protected node can only send PLR information to a downstream LSR if the PLR has signaled PLR capability and the downstream LSR has signaled MPT capability. When the downstream LSR, acting as a MPT, receives the PLR status, it can implicitly infer that the advertised LSR(s) are PLR capable. The MPT LSR can then proceed with setting up a T-LDP session with the PLR(s) and MP LSP for node protection signaling.

Node Protection Capability Message

FIG. 10 is a simplified diagram of a Node Protection Capability Message 1000 in accordance with an embodiment of the present disclosure. Node Protection Capability Message 1000 defines a single capability "MP Node Protection Capability" parameter TLV to announce PLR and MPT capability. Node Protection Capability Message 1000 includes a "U" bit 1002, an "F" bit 1004, an MP Node Protection Capability field 1006, a Length Field 1008, an "S" bit 1010, a Reserved field 1012, a "P" bit 1014, an "M" bit 1016, and a Reserved field 1018.

The "U" bit 1002, and "F" bit 1004 is set to 1 and 0 respectively as per "LDP Capabilities", RFC 5561. The MP Node Protection Capability field 1006 is a TLV type field. In a particular embodiment, the value of the MP Node Protection Capability field 1006 is assigned by IANA. The Length field 1008 is set to 2. The "S" bit 1010 is set to 1 to announce and 0 to withdraw the capability as per RFC 5561. The "P" bit 1014 indicates PLR capable for MP LSP node protection. The "M" bit indicates MPT capable for MP LSP node protection. The Reserved fields 1012 and 1018 are set to zero on transmit and ignored on receipt.

In at least one embodiment, Node Protection Capability Message 1000 is sent in an LDP Initialization message to announce capability at the time of session establishment time. Alternately, Node Protection Capability Message 1000 is sent in a LDP Capability message to dynamically update (announce or withdraw) its capability towards its peer using procedures specified in RFC 5561.

In some embodiments, an LSR that supports the PLR functionality may send this capability to its downstream MP peers with "P" bit set; whereas, an LSR that supports an the MPT functionality may send this capability to its upstream peer with "M" bit set. Moreover, an LSR that supports both the PLR and MPT functionality may send this capability to its peers with both the "P" and "M" bit set.

Security Considerations

In at least one embodiment, the same security considerations as described in RFC 6388 for the base mLDP specification may be applied to the present embodiments described herein.

Note that in certain example implementations, the node protection functions outlined herein may be implemented by logic encoded in one or more tangible non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, the routers including the LSRs, protected nodes, MPTs and/or PLRs may include software in order to achieve the node protection functions outlined herein. These activities can be facilitated by node protection modules 116. The routers can include memory elements 114 for storing information to be used in achieving the intelligent forwarding determination activities, as discussed herein. Additionally, the routers may include a processor 112 that can execute software or an algorithm to perform the node protection operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two or more network elements. However, this has been done for purposes of clarity and example only. In certain cases, it may be easier to describe one or more of the functionalities of a given set of flows by only referencing a limited number of network elements. It should be appreciated that communication systems 100, 200, 700, and 800 (and their teachings) are readily scalable and can accommodate a large number of components, as well as more complicated/sophisticated arrangements and configurations. Accordingly, the examples provided should not limit the scope or inhibit the broad teachings of communication systems 100, 200, 700, and 800 as potentially applied to a myriad of other architectures.

It is also important to note that the steps in the preceding flow diagrams illustrate only some of the possible signaling scenarios and patterns that may be executed by, or within, communication systems 100, 200, 700, and 800. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100, 200, 700, and 800 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., LDP, etc.), communication systems 100, 200, 700, and 800 may be applicable to other protocols and arrangements. Moreover, the present disclosure is equally applicable to various technologies, aside from DSL architectures, as these have only been offered for purposes of discussion. Along similar lines, communication systems 100, 200, 700, and 800 can be extended to any Multi-Protocol Label Switching (MPLS) architecture. Similarly, the teachings presented herein can also be used in loop free alternate (LFA) configurations in other embodiments.

Note also that certain embodiments of communication systems 100, 200, 700, and 800 are not necessarily intended to replace existing node protection procedures. The teachings of the present disclosure allow the establishment of a T-LDP session between MPT LSR(s) and PLR LSR(s) in order to provide explicit signaling of Merge Point (MPT) LSR information between either non-directly connected or directly connected LSRs. By using a T-LDP session to signal between the MPT LSR(s) and the PLR LSR(s), various embodiments described herein do not suffer from the problems faced by existing solutions. By having a T-LDP session with the PLR, existing mLDP features currently defined continue to function properly such as Make-Before-Break (MBB), Graceful Restart (GR), Typed Wildcard FEC support, etc.

Additionally, although communication systems 100, 200, 700, and 800 have been illustrated with reference to particular elements and operations that facilitate the communication process, these elements and operations may be replaced by any suitable architecture or process that achieves the intended functionality of one or more of communication systems 100, 200, 700, and 800.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving first address information from a protected node over a first label switched path having a first label, the first address information being associated with a first network element, and a second label switched path being previously established with the first network element;
establishing a targeted session with the first network element, wherein establishing the targeted session with the first network element includes sending a first unicast message addressed to the first network element;
assigning a second label to the second label switched path; and
sending the second label and a forwarding equivalence class label mapping for the second label switched path to the first network element over the targeted session using a second unicast message.

2. The method of claim 1, further comprising:
sending protected node status information to the first network element over the targeted session, the protected node status information including second address information associated with the protected node.

3. The method of claim 2, wherein the protected node status information further includes an indication to the first network element that the second label associated with the second label switched path is not to be used unless the protected node is determined to be unreachable.

4. The method of claim 1, further comprising:
activating the second label assigned to the second label switched path based upon a determination that the protected node is unreachable due to failure of the protected node;
disabling the first label associated with the first label switched path; and
switching traffic to the second label switch path.

5. The method of claim 1, further comprising:
receiving first traffic from the first label switched path and second traffic from the second label switched path due to the protected node being unreachable by the first network element caused by a link failure between the first network element and the protected node; and
dropping the second traffic from the second label switched path.

6. The method of claim 5, further comprising:
receiving an indication from the protected node that the first address information is no longer applicable; and
sending a label withdraw message to the first network element indicating to the first network element to withdraw the second label associated with the second path.

7. The method of claim 1, wherein the first network element comprises a router having Point of Local Repair capability.

8. Logic encoded in one or more non-transitory tangible media that includes code for execution and when executed by a processor operable to perform operations comprising:
receiving first address information from a protected node over a first label switched path having a first label, the first address information being associated with a first network element, and a second label switched path being previously established with the first network element;
establishing a targeted session with the first network element, wherein establishing the targeted session with the first network element includes sending a first unicast message addressed to the first network element;
assigning a second label to the second label switched path; and
sending the second label and a forwarding equivalence class label mapping for the second label switched path to the first network element over the targeted session using a second unicast message.

9. The logic of claim 8, wherein the operations further comprise:
sending protected node status information to the first network element over the targeted session, the protected node status information including second address information associated with the protected node.

10. The logic of claim 9, wherein the protected node status information further includes an indication to the first network element that the second label associated with the second label switched path is not to be used unless the protected node is determined to be unreachable.

11. The logic of claim 8, wherein the operations further comprise:
activating the second label assigned to the second label switched path based upon a determination that the protected node is unreachable due to failure of the protected node;
disabling the first label associated with the first label switched path; and
switching traffic to the second label switch path.

12. The logic of claim 8, wherein the operations further comprise:
receiving first traffic from the first label switched path and second traffic from the second label switched path due to the protected node being unreachable by the first network element caused by a link failure between the first network element and the protected node; and
dropping the second traffic from the second label switched path.

13. The logic of claim 12, wherein the operations further comprise:
receiving an indication from the protected node that the first address information is no longer applicable; and
sending a label withdraw message to the first network element indicating to the first network element to withdraw the second label associated with the second path.

14. An apparatus, comprising:
a memory element configured to store data,
a processor operable to execute instructions associated with the data, and
a node protection module coupled to the processor, wherein the apparatus is configured to:
receive first address information from a protected node over a first label switched path having a first label, the first address information being associated with a first network element, and a second label switched path being previously established with the first network element;
establish a targeted session with the first network element, wherein establishing the targeted session with the first network element includes sending a first unicast message addressed to the first network element;
assign a second label to the second label switched path; and
send the second label and a forwarding equivalence class label mapping for the second label switched path to the first network element over the targeted session using a second unicast message.

15. The apparatus of claim 14, wherein the apparatus is further configured to:
send protected node status information to the first network element over the targeted session, the protected node status information including second address information associated with the protected node.

16. The apparatus of claim 15, wherein the protected node status information further includes an indication to the first network element that the second label associated with the second label switched path is not to be used unless the protected node is determined to be unreachable.

17. The apparatus of claim 14, wherein the apparatus is further configured to:
activate the second label assigned to the second label switched path based upon a determination that the protected node is unreachable due to failure of the protected node;
disable the first label associated with the first label switched path; and
switch traffic to the second label switch path.

18. The apparatus of claim 14, wherein the apparatus is further configured to:

receive first traffic from the first label switched path and second traffic from the second label switched path due to the protected node being unreachable by the first network element caused by a link failure between the first network element and the protected node; and drop the second traffic from the second label switched path.

19. The apparatus of claim 18, wherein the apparatus is further configured to:

receive an indication from the protected node that the first address information is no longer applicable; and send a label withdraw message to the first network element indicating to the first network element to withdraw the second label associated with the second path.

20. The apparatus of claim 14, wherein the apparatus comprises a router having merge point capability.

* * * * *